(12) United States Patent
Bloodworth

(10) Patent No.: US 6,986,238 B1
(45) Date of Patent: Jan. 17, 2006

(54) UNIVERSAL TRIMMER MOUNT ASSEMBLY FOR RIDING MOWER

(76) Inventor: Danny Bloodworth, 119 Vance St., Clinton, NC (US) 28328

( * ) Notice: Subject to any disclaimer, the term of this patent is extended or adjusted under 35 U.S.C. 154(b) by 37 days.

(21) Appl. No.: 10/904,597

(22) Filed: Nov. 18, 2004

(51) Int. Cl.
*A01D 34/84* (2006.01)

(52) U.S. Cl. ........................................ 56/12.7; 56/17.6

(58) Field of Classification Search ................ 56/12.7, 56/17.1, 16.7, DIG. 9; 30/276
See application file for complete search history.

(56) References Cited

U.S. PATENT DOCUMENTS

| | | | |
|---|---|---|---|
| 4,182,100 A | 1/1980 | Letter | 56/16.7 |
| 4,442,659 A | 4/1984 | Enbusk | 56/12.7 |
| 4,642,976 A | 2/1987 | Owens | 56/16.9 |
| 4,718,221 A | 1/1988 | Wessel et al. | 56/16.9 |
| 5,287,683 A | 2/1994 | Smith | 56/12.7 |
| 5,561,969 A | 10/1996 | Sandy | 56/13.6 |
| 5,694,752 A * | 12/1997 | Warfield, III | 56/13.6 |
| 5,802,824 A | 9/1998 | Aldrich | 56/13.7 |
| 5,809,758 A * | 9/1998 | Flanigan et al. | 56/13.7 |
| 6,125,943 A | 10/2000 | Valois | 172/15 |
| 6,601,374 B2 | 8/2003 | Smith | 56/13.6 |
| 6,745,549 B1 | 6/2004 | Taylor | 56/12.7 |
| 6,779,325 B1 | 8/2004 | Robillard, II | 56/12.7 |
| 2002/0148211 A1 | 10/2002 | Templeton et al. | 56/17.1 |

* cited by examiner

*Primary Examiner*—Meredith C. Petravick
(74) *Attorney, Agent, or Firm*—Mills Law Firm PLLC

(57) ABSTRACT

A mount assembly for mounting a conventional trimming device on a riding mover includes an adjustable support arm mounted on the mower deck carries a biaxially pivotal bracket carrying the shaft of the trimming device whereby the operator may selectively pivot the cutter of the trimmer about a wide arcuate path during movement to trim unwanted vegetation.

11 Claims, 5 Drawing Sheets

UNIVERSAL TRIMMER MOUNT ASSEMBLY FOR RIDING MOWER

FIELD OF THE INVENTION

The present invention relates to an apparatus for operating a trimming device from a moving vehicle.

BACKGROUND OF THE INVENTION

Various approaches have been taken for incorporating components on a mower to enable the operator to perform trimming and edging operations around landscapes and borders while mowing the yard. Trimming capabilities have been incorporated into specialized apparatus as disclosed in U.S. Pat. Nos. 5,287,683 to Smith and 6,779,325 to Robillard. Inasmuch as most homeowners already have trimmer and mowers and trimming operations are needed in areas inaccessible to a mower, these approaches, in addition to being costly and complex, provide only problematic benefits.

Others have accordingly recognized that it would be desirable to integrate the homeowner's existing equipment to provide concurrent trimming and mowing capabilities. For instance, U.S. Pat. No. 6,601,374 to Smith patent discloses clamping brackets for mounting a convention weed trimmer on a walk-behind mower 100. The trimmer is mounted at a fixed position at the front wheel. Positioning of the cutting head for trimming requires repetitive maneuvering of the mower to reach needed areas not in the normal mowing path. U.S. Pat. No. 5,802,824 to Aldrich discloses a spring biased arm assembly for vertically mounting an electric trimmer on a riding mower. The trimmer is operated at a normal fixed outboard position and deflects when encountering an obstacle or border. Inasmuch as trimming is commonly done in areas without fixed borders and the cutter is out of sight of the operator, intricate maneuvering of the mower to reach the need areas would prove difficult. U.S. Pat. No. 5,561,969 to Sandy discloses a gas powered trimmer that is mounted by a flexible tether to a support arm attached at the mower deck. While extending the range of movement of the trimmer, the attendant swinging movement of the trimmer makes accurate positioning of the trimmer difficult.

BRIEF SUMMARY OF THE INVENTION

The present invention provides a universal trimmer mount assembly for riding mower that quickly adapts a conventional trimmer to riding mower equipment and provides accurate operator control of the cutting head to trim irregular margins during mower movement. The trimmer is mounted on a biaxial pivot bracket assembly supported on a boom assembly attached to the mower deck. The trimmer is mounted at a releasable clamp permitting ready mounting of the trimmer for motorized use and removal for manual use. The bracket assembly pivots about independent and fixed horizontal and vertical axes allowing a wide range of positioning within sight of the operator as well as accurate tracking on rolling terrain.

DESCRIPTION OF THE DRAWINGS

The above and other features of the present invention will become apparent upon reading the following description of the preferred embodiments taken in conjunction with the accompanying drawings in which.

DETAILED DESCRIPTION OF THE PREFERRED EMBODIMENTS

Figure 1:
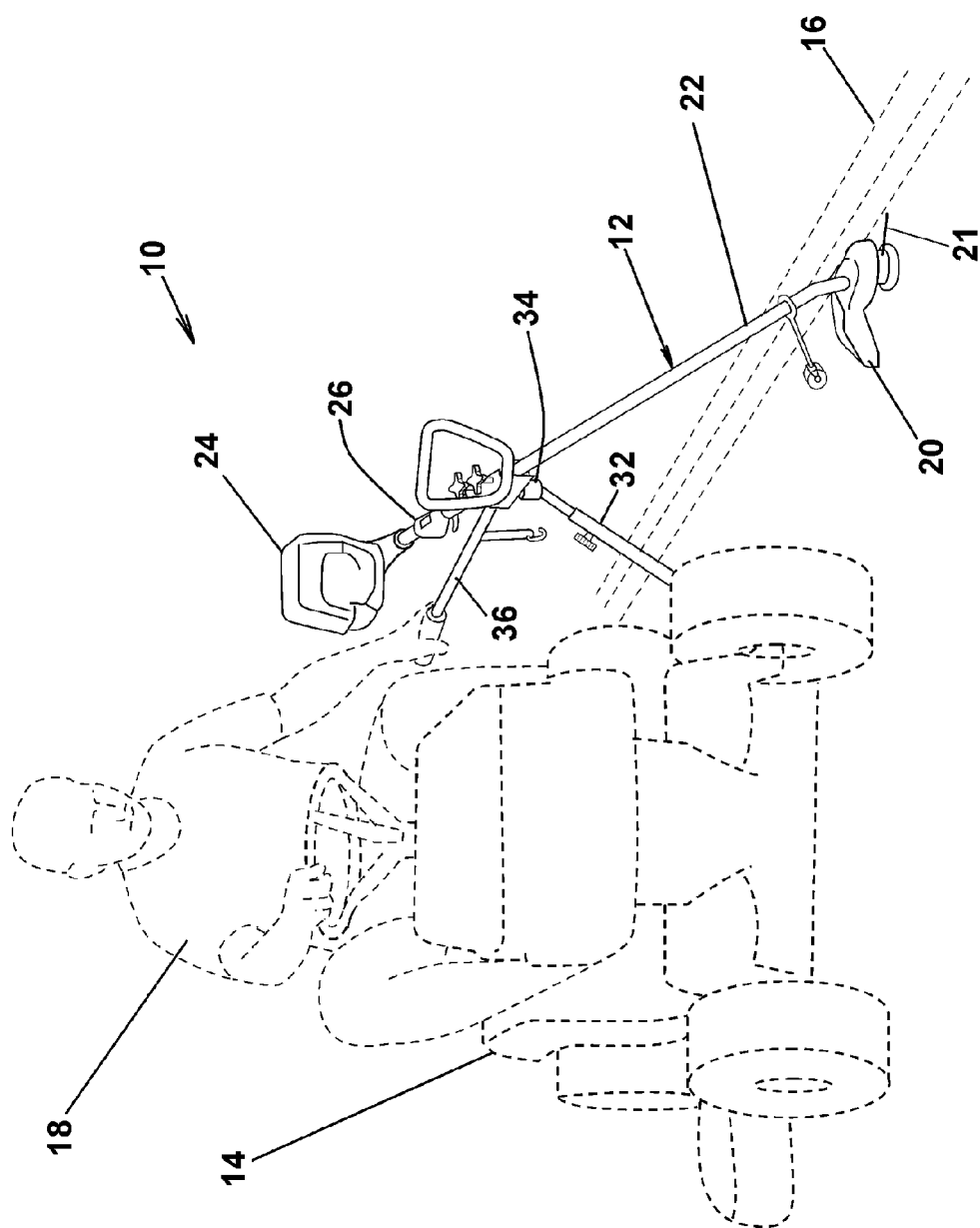
FIG. 1 is a front perspective view of a riding mower provided with a universal trimmer mounting assembly in accordance with an embodiment of the invention.
Figure 2:
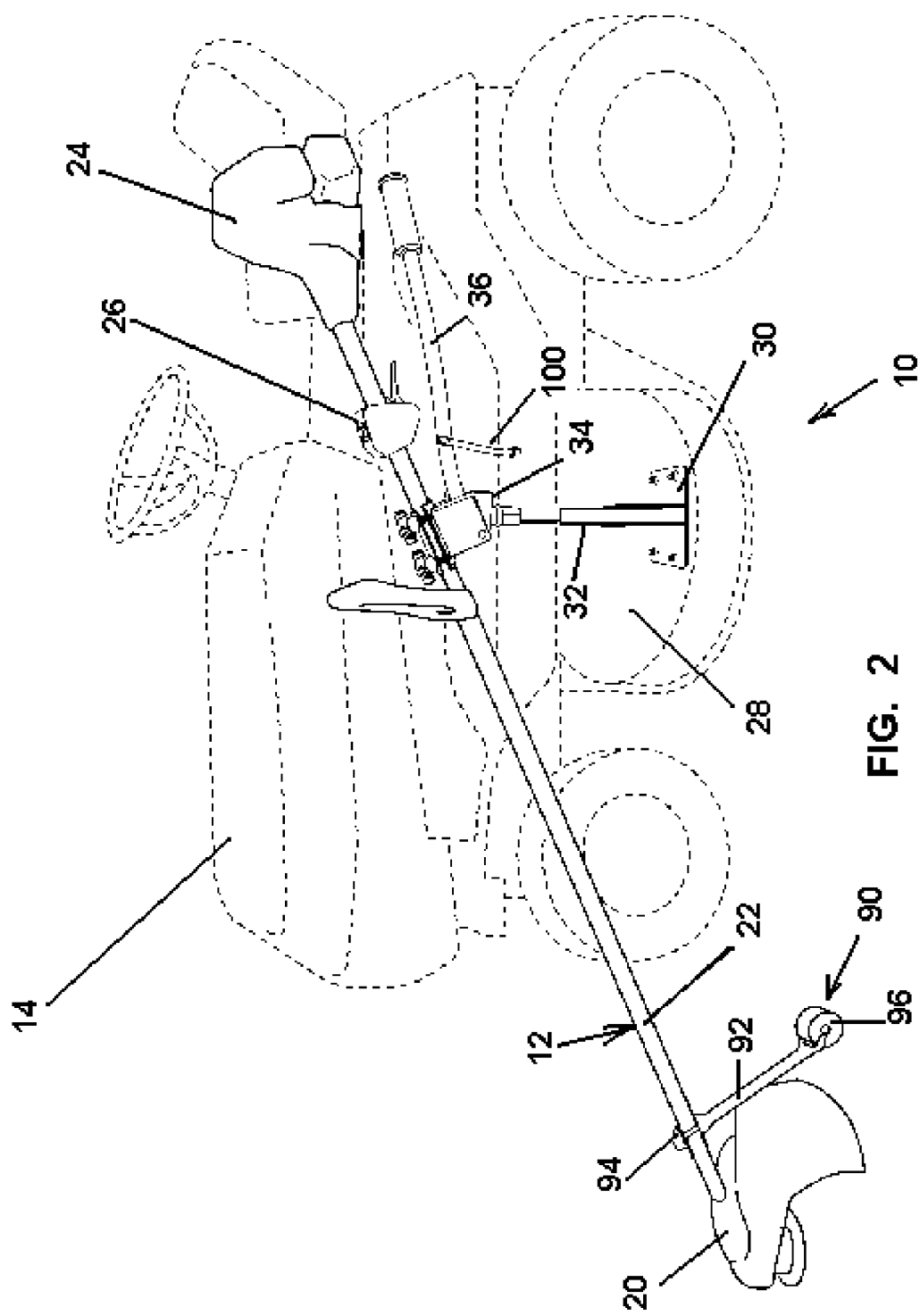
FIG. 2 is a side perspective view of the mower and trimmer mounting assembly of FIG. 1.
Figure 3:
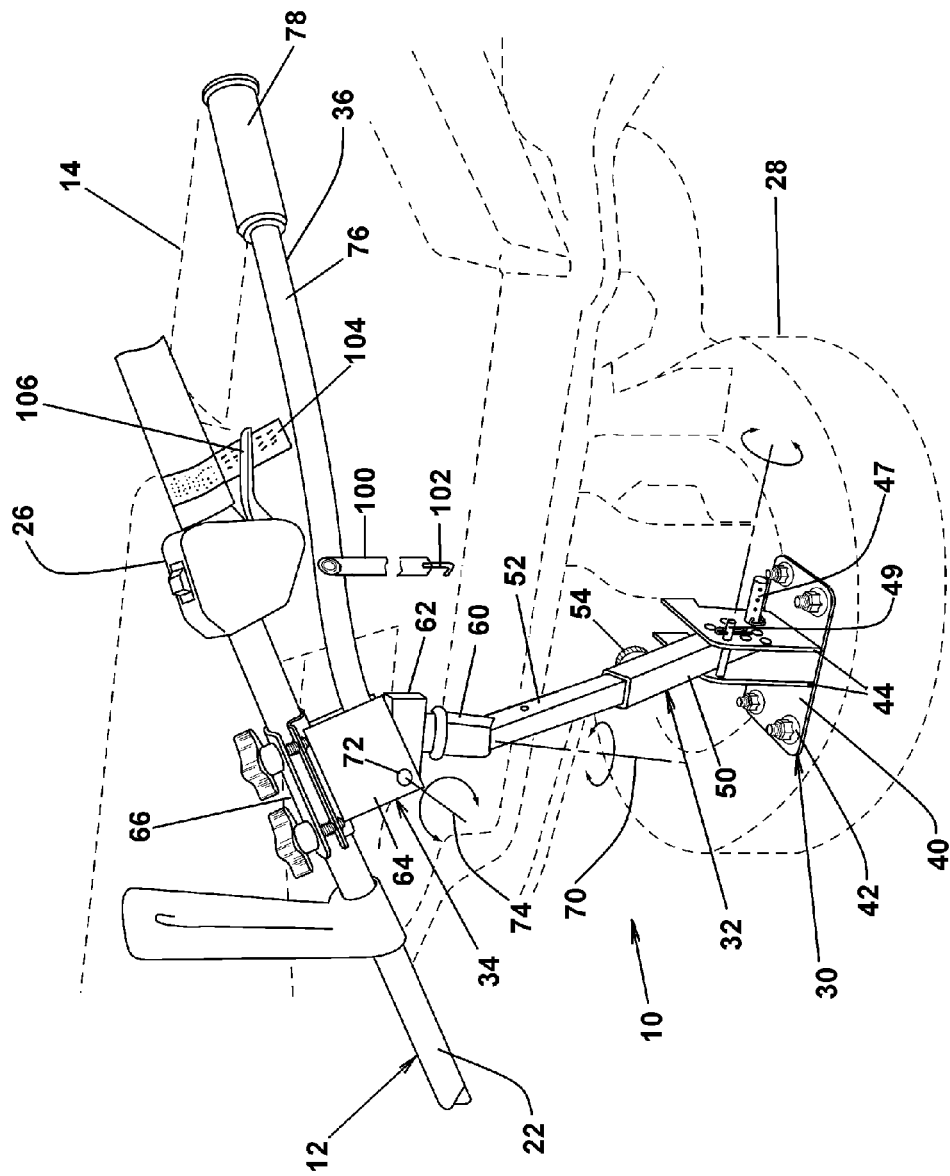
FIG. 3 is an enlarged side perspective view of the trimmer mounting assembly.

Referring to FIGS. 1 through 3, there is shown a mounting assembly 10 for mounting a trimmer 12 on a riding mover 14 for removing unwanted vegetation from a ground area, such as along a border 16, under control of an operator 18 while mowing or traversing a course for trimming operation only. The mounting assembly 10 is generally suitable for most commercially available trimming and edging devices, cord or solid cutters. As shown, the trimmer is characterized by a cutting head 20 carrying a flexible cutting cord 21, an elongated cylindrical support shaft 22, an engine assembly 24 and a throttle assembly 26. The support shafts for such trimming devices may be straight or curved at the lower end. The mounting assembly 10 as hereinafter described allows the operator to mount an available trimmer on available mowers or powered riding vehicles.

For riding rotary mowers, the mounting assembly 10 is mounted outboard on either side of the mower deck 28, preferably on the side opposite the grass discharge chute. The mounting assembly 10 comprises a mounting base 30, a telescopic support arm assembly 32, a biaxial bracket assembly 34, and a positioning handle 36.

Figure 4:
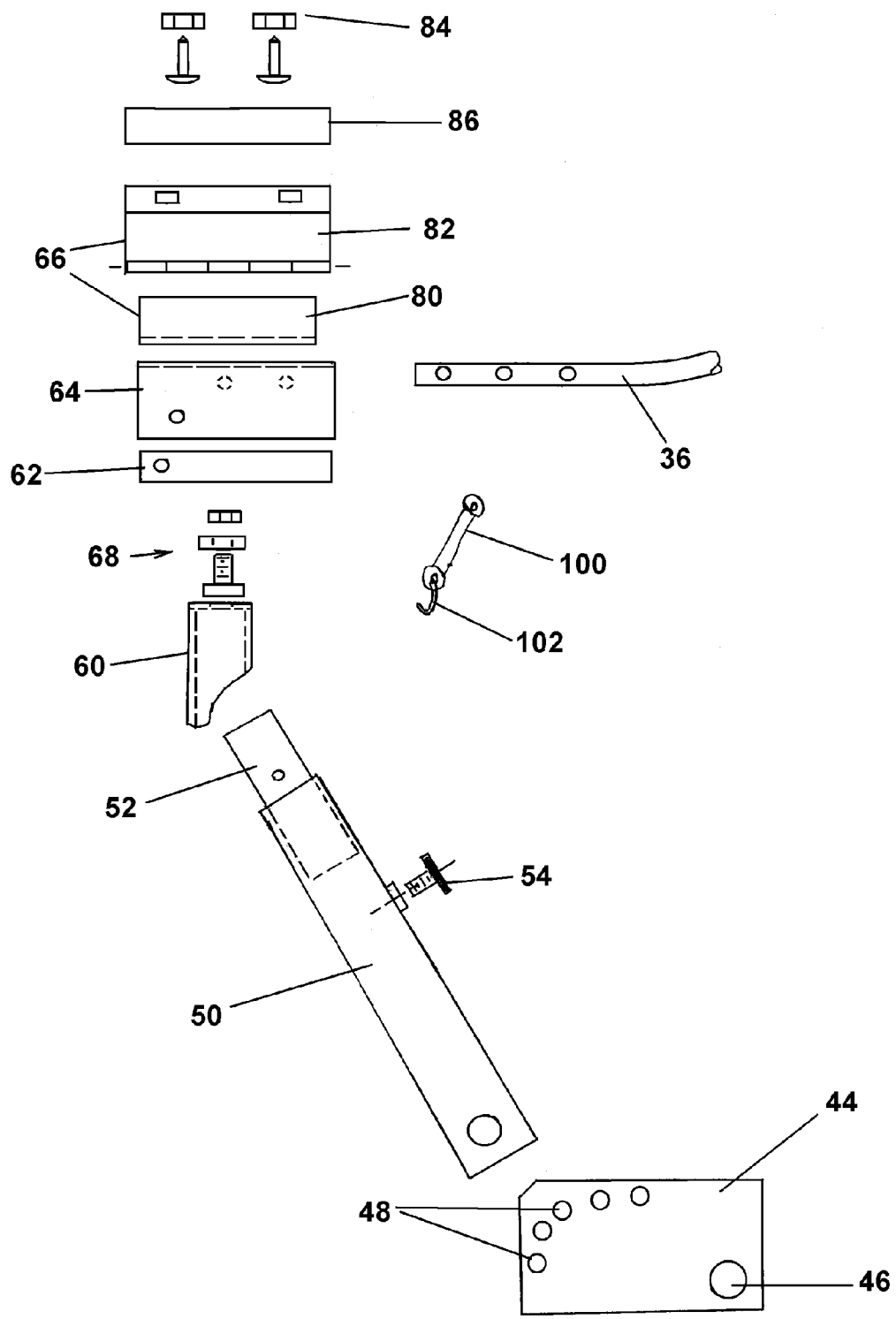
FIG. 4 is an exploded view of the components of the trimmer mounting assembly.
Figure 5:
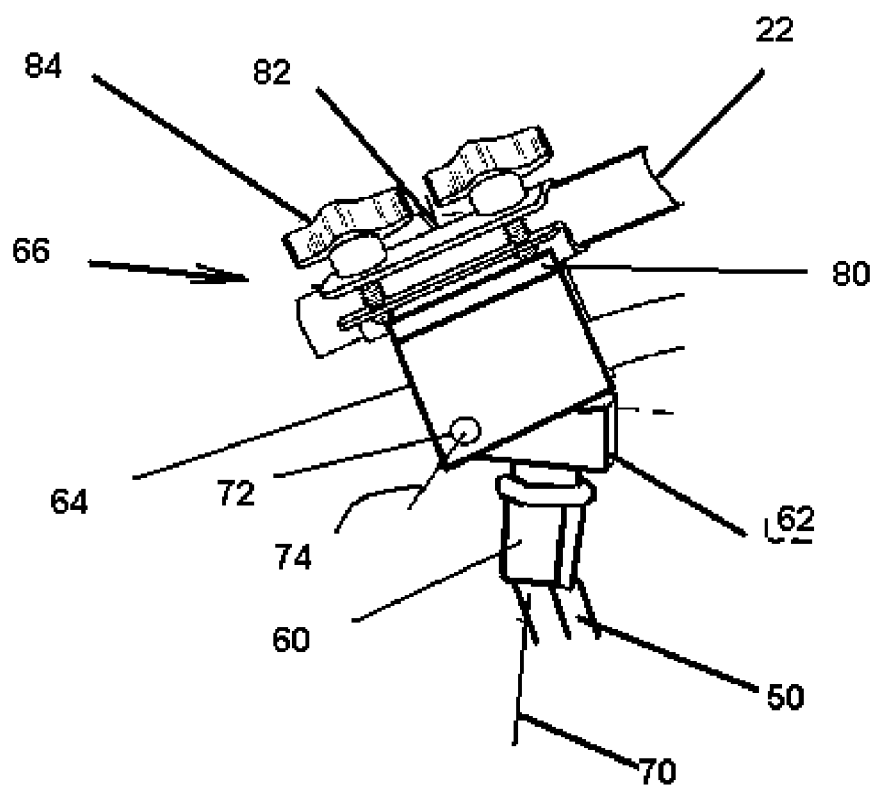
FIG. 5 is an enlarged perspective view of the bracket assembly.

Referring to FIG. 3, the mounting base 30 is mounted on the top generally circular surface of the mower deck 28, preferably on the side opposite the discharge. The mounting base 30 includes a rectangular base plate 40 attached to the mower deck 28 by fasteners 42, and a pair of generally rectangular vertically extending guide plates 44, which are laterally spaced and transversely extending for providing guided inward and outward pivoting of the support arm assembly 32. As shown in FIG. 4, the guide plates 44 are provided with a rear pivot hole 46 for receiving a pivot pin 47 and a series of positioning holes 48 for receiving a cross pin 49 to prescribe the pivoting and the angular positioning of the support arm assembly 32. The pins are preferably retained by the illustrate spring clips or other suitable devices.

The support arm assembly 32 comprises a lower strut 50 and an upper strut 52. The lower strut 50 is formed of rectangular tubing and telescopically supports the upper strut 52, also formed of rectangular tubing. The lower strut 50 carries an adjusting knob 54 for selectively clamping the upper strut for varying the overall length of the support arm assembly 32. The lower end of the lower strut 50 includes a cross hole 56 aligned with the pivot hole 46 providing a pivotal connection at horizontal longitudinal pivot axis about the pivot pin 47. By selective positioning of the cross pin 49 the lower strut rests thereagainst for establishing the desired inclination of the support arm assembly 32 to accommodate differing mower decks, mowing heights and trimmer constructions.

The bracket assembly 34 is mounted at the upper end of the boom assembly 32 and permits the operator 18 to biaxially maneuver the trimmer with the handle assembly 36 as wells as axially adjustably positioning the trimmer shaft 22 for proper cutter alignment. Referring additionally to FIG. 4, the bracket assembly 34 includes a pivot base 60, a support block 62 of rectangular tube, a handle bracket 64 and a clamp assembly 66. The pivot base 600 is formed of rectangular tubing welded at a lower end to the upper end of the upper strut 52 and capped at the upper end. The support block 62 and strut cap are apertured and pivotally connected by a fastener assembly 68 for rotation about a vertical axis 70. The handle bracket 64 is a downwardly opening channel having an upper wall and spaced side walls overlying the sides of the support block 62. The support block 62 and side walls of the bracket 64 are apertured and pivotally interconnected by cross pin 72 for rotation about a horizontal axis 74.

The handle assembly 36 includes a tubular shaft 76 outwardly terminating with a hand grip 78. The inner end of the shaft 76 is provided with a series of cross holes selectively registering with holes on the inner side wall of the bracket for adjustably connecting the shaft 76 to the side wall with fasteners, not shown.

The clamp assembly 36 includes an upwardly opening channel 80 welded to the top of the bracket and in turn welded to the lower section of a clam shell clamp 82. The opposed sections of the clamp 82 are pivotally interconnected at one end and have opposed semi-circular center portions for surrounding and fixedly clamping the shaft 22 of the trimmer 12 in the closed position. The outer ends of the clamp sections terminate with apertured flanges that are releasably clamped together by wing nut assemblies 84. An elastomeric spacer sleeve 86 may be wrapped around the shaft between the clamp sections for dampening and distributing the clamping load for differing shaft sizes. The wing nut assemblies 84 may be removed, the clamp opened, and the trimmer removed for conventional manual edging.

A guide wheel assembly 90 is removably carried at the lower end of the shaft 22 of the trimmer 12 for permitting adjustment of the trimming height. The guide wheel assembly 90 includes a support arm 92 connected by adjustable clamp 94 to the shaft 22 and pivotally supporting a guide wheel 96 at the lower end. The clamp 94 may be variably positioned along the shaft 22 for setting the minimum cutting height and tracking the ground contour. The guide wheel assembly 90 has sufficient flexibility to allow tapping the trimmer against the ground to activate mechanisms for cutting cord release.

A retaining strap 100 is attached at an upper end to the shaft of the handle assembly 36 and includes a hook 102 at the lower end that engages a hole in the upper strut 52 for raising the trimmer 12 about the horizontal axis to an inactive raised position.

A speed control strap 104 is carried on the trimmer shaft 22 adjacent the throttle assembly 26 and is adjustable about the throttle lever 106 for adjusting and maintaining engine speed during operation. A hook and loop fastening system for the strap is suitable.

The assembly 10 may be mounted on a mower deck 28 by drilling holes therein for assembly of the base assembly thereto. Thereafter, the trimmer 12 is mounted at the clamp assembly and axially and rotatably adjusted to position the cutter generally parallel to the ground. As necessary, the inclination of the boom assembly 32 can be adjusted at the pins 49 in combination with foregoing to establish the desired cutting position. The wheel assembly 90 is then positioned to establish the cutting height. The engine may then be started and the speed adjusted with the strap.

For trimming, the operator 18 has a wide range of lateral positioning about the vertical axis, from a forward position interior of the front wheels to an outboard position accommodated by permissible movement of the handle assembly 36. Because of the fixed vertical pivot axis, the operator may accurately position the cutter head in concert with mower movement, with terrain contour accommodated by the horizontal pivot axis. When trimming is completed, the trimmer may be moved to the raised position with the retaining strap. Alternatively, the trimmer may be removed from the clamp assembly for conventional use. For compact storage of both the mower and the trimmer, the pivot pin 27 may be removed from the base assembly 30, allowing removal of the trimmer and boom assembly from the mower.

Having thus described a presently preferred embodiment of the present invention, it will now be appreciated that the objects of the invention have been fully achieved, and it will be understood by those skilled in the art that many changes in construction and widely differing embodiments and applications of the invention will suggest themselves without departing from the sprit and scope of the present invention. The disclosures and description herein are intended to be illustrative and are not in any sense limiting of the invention, which is defined solely in accordance with the following claims.

What is claimed is:

1. A mower with an universal trimmer mount assembly for removing vegetation about a grass covered ground area comprising: a motorized riding mower having a mower deck with cutting means for mowing the grass; a trimmer having a lower cutting device for removing the vegetation connected to a gas powered engine with an elongated cylindrical shaft, a base member attached to a top surface of said mower deck, said base member having laterally extending, longitudinally spaced plates forming a laterally extending slot; an adjustable length support arm member having a lower end provided with a lower aperture; a first pair of opposed apertures in the spaced plates of said base member; a first pin member received in said apertures of said lower end and said spaced plates for pivotally connecting said support arm to said base member whereby said support arm is received in said slot and laterally supported by said spaced plates for inward and outward lateral movement; sets of opposed openings formed in an array in said spaced plates outward of said first pair of apertures in said plates; a second pin member disposed in a select set of said opposed openings in said array contacting and vertically inclining said support arm; a lower bracket member having spaced side walls; means for pivotally connecting an upper end of said support arm to said lower bracket member for rotation about a generally vertical fixed axis; an inverted U-shaped upper bracket member having spaced side walls overlying and slidably engaging said spaced side walls of said lower bracket member; means for pivotally connecting said lower bracket member to said side walls of said upper member for rotation about a generally horizontal fixed axis; a control handle having a forward end connected to said upper bracket member and a rearward end projecting rearwardly of said upper bracket member for manual control by an operator on said riding mower; a clamping member fixedly connected to said upper bracket member, said clamping member having opposed semi-cylindrical sections for directly engaging said shaft of said trimmer; means for releasably engaging said sections of said clamping member against said shaft of said trimmer thereby permitting adjusting the position of the trimmer and the cutting device whereby the operator may position the cutting device by select movement accommodated solely by said fixed axes to remove undesired vegetation by selective cojoint movement to the trimming device about said axes.

2. A mower trimming apparatus for removing vegetation about a grass covered ground area comprising: a motorized riding mower having a mower deck with cutting means for mowing the grass; a trimmer having a lower cutting device for removing the vegetation connected to a gas powered engine with an elongated cylindrical shaft; a base member attached to a top surface of said mower deck; a vertically outwardly inclined support arm member having a lower end connected to said base member closely adjacent said mower deck; a bracket assembly, said bracket assembly having a lower member pivotally attached to an upper end of said support arm for rotation about a generally vertical axis, said bracket assembly having an upper member pivotally connected to said lower member closely adjacent said vertical axis for rotation about a generally horizontal axis; a control handle projecting rearwardly of said upper member for manual control by an operator on said riding mower; and a releasable clamping member fixed to said upper member, said clamping member having opposed semi-cylindrical sections engaging and slidably supporting said shaft of said trimmer for adjusting the position of the trimmer and the cutting device whereby the operator may position the cutting device to remove undesired vegetation by selective cojoint movement to the trimming device about said axes.

3. A mower trimming apparatus for removing vegetation about a grass covered ground area comprising: a motorized riding mower having a mower deck with cutting means for mowing the grass; a trimmer having a lower cutting device for removing the vegetation connected to a gas powered engine with an elongated cylindrical shaft; a base member attached to a top surface of said mower deck, said base member having laterally extending, longitudinally spaced plates forming a laterally extending slot; a support arm member having a lower end received in said slot and slidably supported by said spaced plates; means connecting said lower end of said support arm member to said spaced plates of said base for pivotal movement and vertical inclination about a horizontal longitudinal axis; means cooperating between said spaced plates of said base member and said support arm members for adjusting said vertical inclination; a generally rectangular lower bracket member having spaced side walls; means for pivotally connecting an upper end of said support arm to said lower bracket member for rotation about a generally vertical axis, a generally inverted U-shaped upper bracket member having spaced side walls overlying and slidably engaging said spaced side walls of said lower bracket member; means for pivotally connecting said lower bracket member to said side walls of said upper member for rotation about a generally horizontal axis; a control handle having a forward end connected to said upper bracket member and projecting rearwardly of said upper bracket member for manual control by an operator on said riding mower; a releasable clamping member connected to said upper bracket member, said clamping member fixedly connected to said upper bracket member and having opposed semi-cylindrical sections for directly engaging and slidably supporting said shaft of said trimmer for adjusting the position of the trimmer and the cutting device whereby the operator may position the cutting device to remove undesired vegetation by selective cojoint movement to the trimming device about said axes.

4. A mount assembly for operatively supporting a motorized trimming device on a riding vehicle for removing vegetation about a ground area, the trimming device characterized by a lower cutting device and an elongated center shaft connected at an upper end to a power source, said mount assembly comprising: a base member attached to a top surface of said riding vehicle having laterally extending, longitudinally spaced side plates forming a laterally extending slot; a support arm member having a lower end received in said slot and slidably supported by said side plates; a removable pin member connecting said lower end of said support arm member to said side plates of said base for allowing pivotal movement about a first axis transverse to said side plates; means for adjusting the pivotal position of said support arm relative to said side plates; a bracket assembly having a lower member and an upper member, said lower member having spaced side walls; means for pivotally connecting an upper end of said support arm to said lower member for rotation about a second axis transverse to said first axis, said upper member having a generally inverted U-shape including a top wall above said lower member and spaced side walls overlying and slidably engaging said spaced side walls of said lower member; means for pivotally connecting said lower member to said side walls of said upper member for rotation about a third axis transverse to said second axis and said first axis; a control handle having a forward end connected to said upper member and projecting rearwardly of said upper member; a releasable clamping member fixed to said upper member having opposed sections for directly engaging and slidably supporting said shaft of said trimmer.

5. The mount assembly as recited in claim 4 wherein the riding vehicle is a riding mower and the lower portion of the riding vehicle is a circular mower deck.

6. The mount assembly as recited in claim 5 wherein said support arm has a variable length.

7. The mount assembly as recited in claim 6 wherein said support arm includes a pair of telescopic strut members connected at a lower end to said base member and at an upper end to said bracket assembly, and including means for varying the overall length of said strut members.

8. The mount assembly as recited in claim 7 including tie means operative between said support arm and said handle for maintaining said upper member of said bracket assembly in a raised position.

9. The mount assembly as recited in claim 8 wherein said clamping member comprises a pair of pivotally connected sections and means for clamping said pivotally connected sections against the shaft of the trimming device.

10. The mount assembly as recited in claim 9 including guide wheel means for attaching to the shaft of the trimming device to maintain the cutting device a select distance above the ground whereby the cutting device tracks the contour of the ground during trimming.

11. The mount assembly as recited in claim 10 wherein said power source includes a speed control lever and an adjustable strap member on said handle means selectively moves the speed control lever to maintain an operating speed for the power source.

* * * * *